United States Patent
Zuzart et al.

(10) Patent No.: US 12,493,658 B2
(45) Date of Patent: Dec. 9, 2025

(54) METHOD AND SYSTEM FOR MANAGING COMPUTER AIDED DESIGN (CAD) DOCUMENTS

(71) Applicant: HCL Technologies Limited, New Delhi (IN)

(72) Inventors: Christine Zuzart, Pune (IN); Rahul Rajadhyaksha, Navi Mumbai (IN)

(73) Assignee: HCL Technologies Limited, New Delhi (IN)

( * ) Notice: Subject to any disclaimer, the term of this patent is extended or adjusted under 35 U.S.C. 154(b) by 257 days.

(21) Appl. No.: 18/371,678

(22) Filed: Sep. 22, 2023

(65) Prior Publication Data

US 2025/0036691 A1 Jan. 30, 2025

(30) Foreign Application Priority Data

Jul. 28, 2023 (IN) .............................. 202311050903

(51) Int. Cl.
  *G06F 16/93* (2019.01)
  *G06F 16/906* (2019.01)
(52) U.S. Cl.
  CPC ............ *G06F 16/93* (2019.01); *G06F 16/906* (2019.01)
(58) Field of Classification Search
  CPC ............................... G06F 16/93; G06F 16/906
  See application file for complete search history.

(56) References Cited

U.S. PATENT DOCUMENTS

| | | | |
|---|---|---|---|
| 7,466,313 | B2 | 12/2008 | Kehrle et al. |
| 8,799,849 | B2 | 8/2014 | Brathwaite et al. |
| 2020/0387788 | A1 | 12/2020 | Alves et al. |
| 2022/0004677 | A1 | 1/2022 | Zhang et al. |
| 2022/0198077 | A1 | 6/2022 | Mora et al. |

OTHER PUBLICATIONS

C. A. McMahon, D. Davies; The Use of Annotation in Design Representation; Jan. 1, 2006; 105-111; https://www.designsociety.org/publication/25933/THE+USE+OF+ANNOTATION+IN+DESIGN+REPRESENTATION.
Hyunsoo Lee; Jonghyun Kim; Amarnath Banerjee; Collaborative intelligent CAD framework incorporating design history tracking algorithm; Aug. 7, 2010; https://doi.org/10.1016/j.cad.2010.08.001.
Rahul Rajadhyaksha, A New Approach to Design and Manufacturing Collaboration Whitepaper, GeometricTech by HCL Technologies, 2017, pp. 1-10.

*Primary Examiner* — Asher D Kells
(74) *Attorney, Agent, or Firm* — Kendal M. Sheets

(57) ABSTRACT

A method for managing computer aided design (CAD) documents is disclosed. In some embodiments, the method includes generating a signature corresponding to a CAD document including a set of regions. The method further includes analysing the CAD document based on the signature and an associated document type. The method further includes categorizing each of the set of regions into one of a set of pre-defined classification categories based on the analysis. The method of further includes generating feedback corresponding to each of the set of regions based on an associated classification category of the set of pre-defined classification categories, upon categorizing. The method further includes rendering the feedback associated with one or more regions of the set of regions based on user requirements.

21 Claims, 10 Drawing Sheets

METHOD AND SYSTEM FOR MANAGING COMPUTER AIDED DESIGN (CAD) DOCUMENTS

TECHNICAL FIELD

Generally, the invention relates to computer aided designs. More specifically, the invention relates to method and system for managing computer aided design (CAD) documents.

BACKGROUND

Accelerating time required to launch a product in the market is a key challenge faced by organizations globally. Before the product's launch, organizations have to ensure that their product not only reaches the market ahead of competitors, but also is of the best quality. For this, organizations are required to reduce needless design to production iterations in order to meet their time-to-market objectives. However, before launching their products in the market, design reviews are essential for avoiding product cost and quality issues. Traditionally, as part of a gated process, organizations reviewed designs sequentially once they were submitted. Moreover, design engineers were provided with checklists and guidebooks to verify that the designs have minimal issues when they are submitted. In this process, due to the retirement of their existing employees (e.g., senior, and experienced engineers) of the organizations, the organizations face a lot of challenges with loss of knowledge, which in turn affects the design review process.

Over time, the traditional gated process was enhanced by including automated review feedback for the design engineers within the computer-aided design (CAD) environment using DFX software (Design for excellence (DFX), or Design for 'X', where X might be a downstream function such as manufacturing, assembly, and so on). Some of the existing tools used by organizations in the design review process includes either word processors, presentation software, design checkers, or viewers with markup functionalities, and the like. However, these tools are typically used in a standalone manner with their output converted into images or other documents and attached in the design versioning system used by the organizations.

At the same time, during the design reviews process, the organizations generate a lot of data and knowledge over time. It is important that this knowledge can be reviewed while performing collaborative review process. Traditionally, this knowledge has been captured in handbooks using design rules. However, there is a need to capture and store the designs knowledge with associated reviews, and trade-offs in an efficient way to leverage the same for future design analysis and reviews. Moreover, this traditional review process done using images, documents, and presentations are required to be improved, such that the focus is on changes in the designs across revisions rather than complete design aided by software-based recommendations on the impact of the design changes along with designer comments on any recommendations which cannot be implemented using these existing tools and processes.

To accelerate the product's market launching time the design review iteration time needs to be compressed and the design reviews process needs to be accelerated by closely monitoring some of the major factors, such as, timing and process required for these design reviews. In addition, this traditional design analysis and review process needs to be improved by providing context and knowledge about similar designs, associated results, and designer/reviewer (e.g., senior design engineers, quality engineers, manufacturing engineers, industrialization engineers, etc.) comments at the right time during design and review. Moreover, there is a requirement of a collaborative workflow to automate design review process as there are trade-offs between cost, function and quality given the context of the design based on the nature of the design process, as such trade-offs cannot be determined and are signed-off only by the design teams. Since, different teams use different tools and software in the design to manufacture lifecycle. Hence it is important that each member of these teams can review and provide feedback in their tool of choice, thereby reducing context switching and allowing experts to collaborate easily at the right time in order to help reduce the long design iteration cycles.

Therefore, there is a need for implementing an efficient and reliable technique for managing CAD documents to address shortcomings of existing disintegrated approach used by the organizations that use disparate tools and processes.

SUMMARY OF INVENTION

In one embodiment, a method for managing computer aided design (CAD) documents is disclosed. The method may include generating a signature corresponding to a CAD document comprising a set of regions. The method may include analysing the CAD document including the set of regions based on the signature and an associated document type. It should be noted that the document type may be one of a new CAD document or an existing CAD document. The method may include categorizing each of the set of regions into one of a set of pre-defined classification categories based on the analysis. It should be noted that the set of pre-defined classification categories may include a modified regions category and a non-modified regions category. In addition, the modified regions category may include an analogous regions category and a non-analogous regions category. The method may include generating feedback corresponding to each of the set of regions based on an associated classification category of the set of pre-defined classification categories, upon categorizing. The method may include rendering the feedback associated with one or more regions of the set of regions based on user requirements.

In another embodiment, a system for managing computer aided design (CAD) documents is disclosed. The system includes a processor and a memory communicatively coupled to the processor. The memory may store processor-executable instructions, which, on execution, may cause the processor to generate a signature corresponding to a CAD document comprising a set of regions. The processor-executable instructions, on execution, may further cause the processor to analyse the CAD document including the set of regions based on the signature and an associated document type. It should be noted that the document type may be one of a new CAD document or an existing CAD document. The processor-executable instructions, on execution, may further cause the processor to categorize each of the set of regions into one of a set of pre-defined classification categories based on the analysis. It should be noted that the set of pre-defined classification categories may include a modified regions category and a non-modified regions category. In addition, the modified regions category may include an analogous regions category and a non-analogous regions category. The processor-executable instructions, on execution, may further cause the processor to generate feedback corresponding to each of the set of regions based on an associated classification category of the set of pre-defined classification categories, upon categorizing. The processor-executable instructions, on execution, may further cause the processor to render the feedback associated with one or more regions of the set of regions based on user requirements.

In yet another embodiment, a non-transitory computer-readable medium storing computer-executable instruction for managing computer aided design (CAD) documents is disclosed. The stored instructions, when executed by a processor, may cause the processor to perform operations including generating a signature corresponding to a CAD document comprising a set of regions. The operations may further include analysing the CAD document comprising the set of regions based on the signature and an associated document type. It should be noted that the document type may be one of a new CAD document or an existing CAD document. The operations may further include categorizing each of the set of regions into one of a set of pre-defined classification categories based on the analysis. It should be noted that the set of pre-defined classification categories may include a modified regions category and a non-modified regions category. In addition, the modified regions category may include an analogous regions category and a non-analogous regions category. The operations may further include generating feedback corresponding to each of the set of regions based on an associated classification category of the set of pre-defined classification categories, upon categorizing. The operations may further include rendering the feedback associated with one or more regions of the set of regions based on user requirements.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
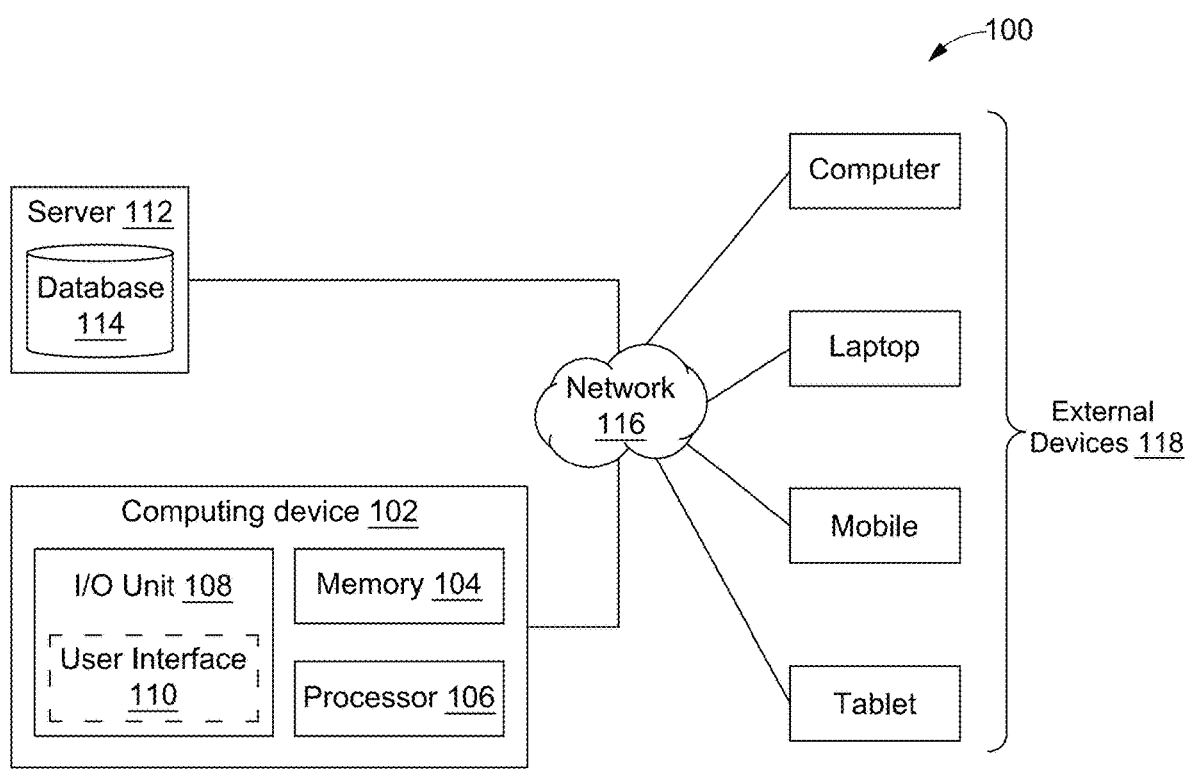
FIG. 1 illustrates a functional diagram of a system configured for managing computer aided design (CAD) documents, in accordance with an embodiment.

A functional diagram of a system 100 configured for managing computer aided design (CAD) documents is illustrated in FIG. 1. As depicted via the present FIG. 1, the system 100 may include a computing device 102. The computing device 102 may be configured to manage a plurality of CAD documents. As will be appreciated for the ease of explanation, managing of one CAD document is explained. However, this similar technique may be used for managing any number of CAD documents. In order to manage the CAD document, initially, the computing device 102 may be configured to generate a signature corresponding to the CAD document. The CAD document may include a set of regions. Further, each of the set of regions may correspond to a design region. The computing device 102 may receive the CAD document as an input from a user.

In an embodiment, the CAD document received as the input may be one of a new CAD document or an existing CAD document. The new CAD document may correspond to a CAD document for which no previous version of the CAD document might exist. Further, the existing CAD document may correspond to a CAD document for which at least one previous version might exist. It should be noted that the signature may be generated based on a version of the CAD document. In other words, the signature may be generated for every version of the CAD document. The user may correspond to a design engineer, for example, senior design engineers, quality engineers, manufacturing engineers, industrialization engineers, design reviewer and the like.

Once the signature is generated for the CAD document, the CAD document may be stored within a database 114 of a server 112. The CAD document may be stored within the database 114 based on the generated signature. In other words, the CAD document may be stored within the database 114 based on its corresponding signature. Upon generating the signature, the computing device 102 may be configured to analyze each of the set of regions of the CAD document. In an embodiment, each of the set of regions may be analyzed based on the signature generated for the CAD document. A method of analyzing the CAD document comprising each of the set of regions is further explained in detail in conjunction with FIG. 4. Further, based on the analysis of each of the set of regions, the computing device 102 may be configured to categorize each of the set of regions into one of a set of pre-defined classification categories.

The set of pre-defined classification categories may include a modified regions category and a non-modified regions category. The modified region category may further include an analogous regions category and a non-analogous regions category. In other words, the modified regions category may include regions of the CAD document in which changes have been made in a current version of the CAD document than its previous version. Whereas the non-modified regions category may include regions of the CAD document in which no changes has been made in the current version of the CAD document in comparison with the previous version. A method of categorizing each of the set of regions into one of the set of pre-defined classification categories has been further explained in detail in conjunction with FIG. 5 and FIG. 7.

Once each of the set of regions has been categorized into one of the set of pre-defined classification categories, then the computing device 102 may be configured to generate feedback corresponding to each of the set of regions. The feedback may be generated for each region based on an associated classification category of the set of pre-defined classification categories. The feedback may correspond to review comments, actions, or corrections associated with each of the set of regions. Upon generating the feedback, the computing device 102 may be configured to render the feedback to the user. In an embodiment, the feedback associated with one or more regions of the set of regions may be rendered to the user based on user requirements. As will be appreciated, the feedback associated with each of the set of regions may be rendered to the user via a user interface 110 of an Input/Output (I/O) device 108.

Examples of the computing device 102 may include, but is not limited to, a mobile phone, a laptop, a desktop, or a PDA, an application server, and so forth. The computing device 102 may further include a memory 104, a processor 106, and the Input/Output unit 108. The I/O unit 108 may further include the user interface 110. A user or an administrator may interact with the computing device 102 and vice versa through the I/O unit 108.

The I/O unit 108 may be used to display results (i.e., result of the new CAD document, or the existing CAD document, a pre-defined classification category associated with each of the set of regions, one or more regions based on the associated classification category, feedback generated for the set of regions, etc.) based on actions performed by the computing device 102, to the user. The user interface 110 may be used by the user to provide inputs to the computing device 102. Thus, for example, in some embodiment, the computing device 102 may ingest an input that includes the CAD document that needs to be managed. Further, in some another embodiment, the computing device 102 may ingest an input that includes feedback that is provided by the user for one or more regions of the set of regions. Further, for example, in some embodiments, the computing device 102 may render intermediate results (e.g., result of the new CAD document, or the existing CAD document, the pre-defined classification category associated with each of the set of regions) or final results (e.g., feedback generated for each of the set of regions) to the user via the user interface 110.

The memory 104 may store instructions that, when executed by the processor 106, may cause the processor 106 to manage CAD documents. The processor 106 may manage the CAD document based on the signature generated for the CAD document. As will be described in greater detail in conjunction with FIG. 2 to FIG. 12, in order to manage the CAD document, the processor 106 in conjunction with the memory 104 may perform various functions including receiving the CAD document from the user, generating the signature corresponding to the CAD document, analysing the CAD document including the set of regions, categorizing each of the set of regions into one of the set of pre-defined classification categories, generating the feedback corresponding to each of the set of regions, rendering the feedback to the user, etc.

The memory 104 may also store various data (e.g., result of the new CAD document, or the existing CAD document, the pre-defined classification category associated with each of the set of regions, the feedback generated for each of the set of regions, etc.) that may be captured, processed, and/or required by the computing device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

Further, the computing device 102 may interact with the server 112 or external devices 118 over a network 116 for sending and receiving various data. The network 116, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In an embodiment, the computing device 102 may fetch information regarding version of the CAD document from the server 112. In addition, the server 112 may provide information, such as information about the feedback associated with one or more analogous regions of the set of regions within the CAD document, etc. to the user. The server 112 may further include a database 114. By way of an example, the database 114 may store information regarding one or more versions previously generated of the CAD document, the one or more analogous regions identified within previous versions of CAD documents, the feedback associated with regions of existing CAD documents. The database 114 may be periodically updated based on new version of the CAD document, new CAD document, the feedback associated with regions present with each CAD document, the feedback generated for each of a set of regions of new CAD document and the like. Alternatively, the computing device 102 may receive input from the user from one of the external devices 118. This complete process followed by the system 100 is further explained in detail in conjunction with FIG. 2 to FIG. 12.

Figure 2:
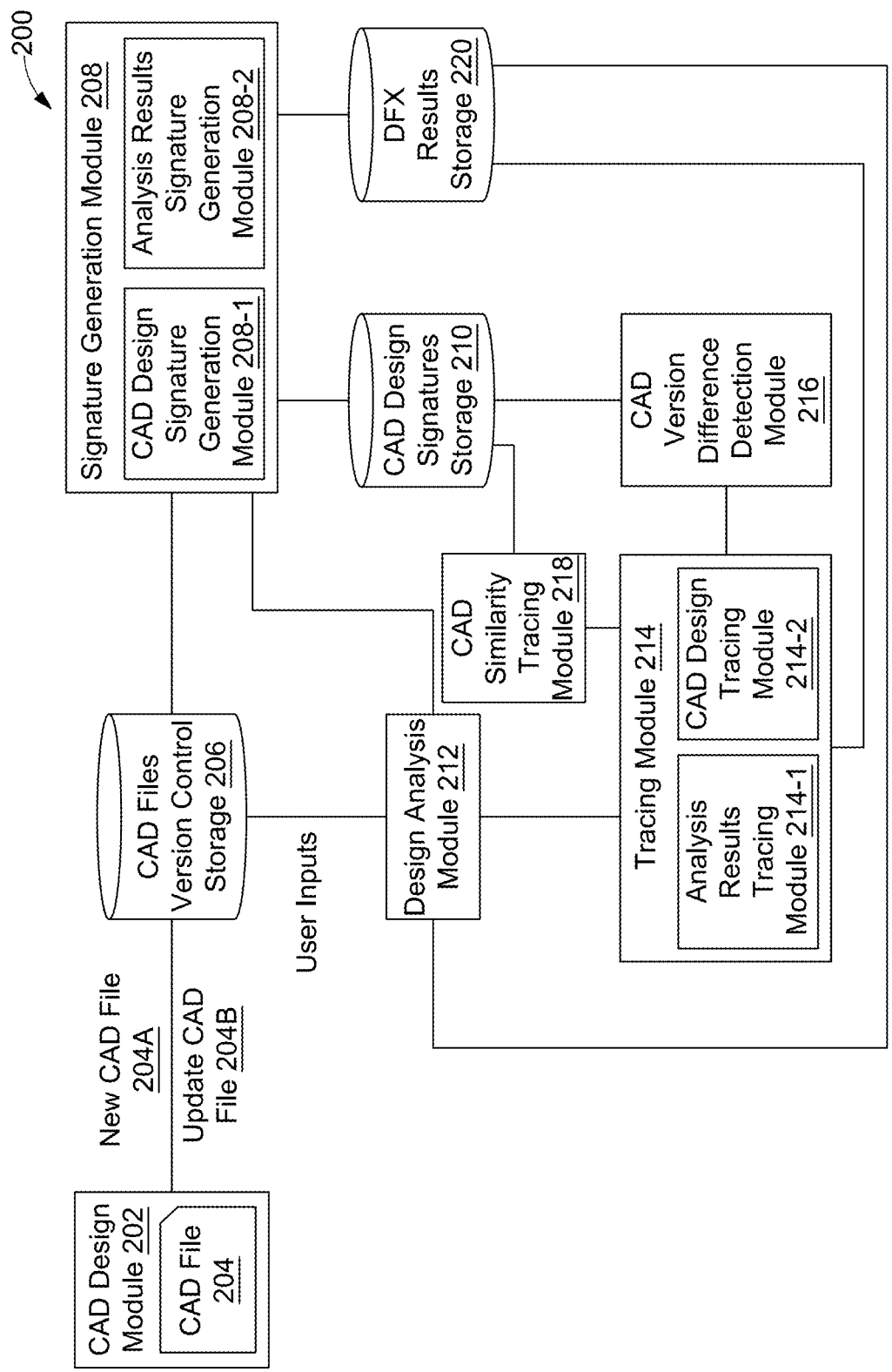
FIG. 2 illustrates a block diagram of various modules present within a memory of a computing device configured for managing CAD documents, in accordance with an embodiment.

Referring now to FIG. 2, a functional block diagram of various modules within the memory 104 of the computing device 102 configured for managing CAD documents, in accordance with an embodiment. The memory 104 may include a CAD design module 202, a signature generation module 208, a design analysis module 212, a tracing module 214, a CAD version difference detection module 216, and a CAD similarity tracing module 218. Further, a CAD files version control storage 206, a CAD design signatures storage 210, and a DFX (Design for 'X') results storage 220 may correspond to the database 114 of the server 112.

The CAD design module 202 may be used by the user to design a CAD document. In other words, initially the CAD design module 202 may be configured to receive the CAD document as an input from the user. The CAD document may correspond to a CAD file 204. In one embodiment, when the CAD file 204 is a new CAD file 204A, then the CAD design module 202 may be used to design each of the set of regions of the CAD file 204. In another embodiment, when the CAD file 204 is an updated CAD file 204B, then the CAD design module 202 may be used to modify one or more regions of the CAD file 204. In other words, the CAD design module 202 may be triggered in two events: first when the user creates the new CAD file 204A and to check-in in the CAD files version control storage 206, and second when the user modifies an existing CAD file that was checked-out from the CAD files version control storage 206 and check-in the updated CAD file 204B with modifications.

Once the CAD file 204 is designed (i.e., created or modified), the CAD file 204 may be stored within the CAD files version control storage 206. The CAD files version control storage 206 may be configured to store the CAD file 204 based on version of the CAD file 204. By way of an example, when the CAD file 204 is the new CAD file 204A, then first version of the new CAD file 204A may be saved as 'CAD A.1', where 'A' represents first CAD file, and '1' represents the first version of the new CAD file 204A. By way of another example, when the CAD file 204 is the updated CAD file 204B (same as the existing CAD file), then current version (say fourth version) of third CAD file may be saved as 'CAD C.4', where 'C' represents the third file and '4' represents the fourth version of the third CAD file. This means that the updated CAD file 204B may have three existing previous versions.

In order to store the CAD file 204 within the CAD file version control storage 206, the signature generation module 208 may be configured to generate a signature corresponding to the CAD file 204. For generating the signature, the signature generation module 208 may include a CAD design signature generation module 208-1 and an analysis results signature generation module 208-2. It should be noted that the signature corresponding to the CAD file 204 may be generated based on the current version (i.e., the new CAD file 204A or the updated CAD file 204B) of the CAD file 204. In particular, the CAD design signature generation module 208-1 may be configured to generate the signature for the CAD file 204. Once the signature for the CAD file 204 is generated, then the generated signature may be stored in the CAD design signatures storage 210. Further, the CAD file 204 may be stored within the CAD files version control storage 206 based on the generated signature. As will be appreciated, the signature generated for a CAD file may be a vector of numeric float values.

Once the CAD file 204 is created and stored, then the design analysis module 212 may be configured to analyze the CAD file 204 to determine the document type of the CAD file 204. The document type may be one of a new CAD file (same as the new CAD file 204A) or an existing CAD file (same as the updated CAD file 204B). In order to determine the document type of the CAD file 204, the design analysis module 212 may be configured to compare the signature generated by the signature generation module 208 for the CAD file 204 with the signature associated with each of the plurality of existing CAD documents that is stored within the CAD design signatures storage 210. In order to perform the comparison, upon receiving the signature corresponding to the CAD file 204, the design analysis module 212 may be configured to request the tracing module 214 to analyze and trace the signature of the CAD file 204 and the signature of each of the plurality of existing CAD document retrieved from the CAD design signatures storage. Further, based on the analysis, the tracing module 214 may be configured to identify the document type of the CAD file 204.

In one embodiment, based on the comparison, when the signature associated with the CAD file 204 matches with a signature associated with an existing CAD document of the plurality of CAD document, then the CAD file 204 may be determined to be an updated version of the existing CAD document. In other words, the CAD 204 may be determined to be the updated CAD file 204B. In another embodiment, based on the comparison, when the signature associated with the CAD file 204 does not match with the signature associated with each of the plurality of existing CAD documents, then the CAD document may be determined to be a new CAD document, i.e., the new CAD file 204A. A method determining the document type of the CAD document is further explained in detail in conjunction with FIG. 4.

Further, the design analysis module 212 may interact with the DFX results storage 220 to generate the feedback for each region of the CAD file 204 using the tracing module 214. To generate the feedback, upon determining the document type of the CAD file 204, the tracing module 214 may be configured to analyze and trace the CAD file 204 based on the determined document type. The tracing module 214 may analyze and trace the CAD file 204 to generate feedback corresponding to each of a set of regions of the CAD file 204. In order to analyze and trace each of the set of regions, the tracing module 214 may include an analysis results tracing module 214-1 and a CAD design tracing module 214-2. The analysis results tracing module 214-1 may be configured to analyze historical dataset and each of the set of regions of the CAD file 206 to determine the associated feedback. In order to retrieve the feedback, the CAD design tracing module 214-2 may be configured to trace each of the set of regions of the CAD file 204. In particular, in order to retrieve the feedback, the CAD design tracing module 214-2 may be configured to trace each of the set of regions associated with the plurality of existing CAD documents present within the historical dataset using the corresponding signature. If the tracing module 214 does not retrieve feedback from the historical dataset, the design analysis module 212 may generate new feedback.

Further, to generate the feedback, in one embodiment, when the CAD file 204 is determined to be the updated CAD file 204B, then the CAD version difference detection module 216 may be configured to compare the updated CAD file 204B with previous version of the updated CAD file 204B. In order to compare, the CAD version difference detection module 216 may retrieve and compare the signature associated with the updated CAD file 204B with the signature of the previous version of the updated CAD file 204B. Further, based on the comparison, the CAD version difference detection module 216 may identify each of one or more modified regions of the set of regions of the updated CAD file 204B.

In other words, the CAD version difference detection module 216 may categorize each of the set of regions of the updated CAD file 204B into one of the set of pre-defined classification categories. The set of pre-defined classification categories may include a modified regions category and a non-modified regions category. The modified region category may further include an analogous regions category and a non-analogous regions category. The modified regions category may include one or more modified regions of the set of regions. Further, the non-modified regions category may include one or more non-modified regions. In an embodiment, each of the one or more modified regions may correspond to regions (or areas) that have undergone some design changes. In other words, the CAD version difference detection module 216 may be configured to identify regions with current design change. Further, each of the one or more non-modified regions may correspond to regions that have not been altered. It should be noted that, the CAD version difference detection module 216 may retrieve the signature associated with current version of the updated CAD file 204B and the previous version of the updated CAD file 204B from the CAD design signatures storage 210.

Once each of the one or more non-modified regions is identified, then the CAD design tracing module 214-2 may be configured to trace and analyze each of the one or more non-modified regions. Further, based on analysis of each of the one or more non-modified regions, the analysis results tracing module 214-1 may be configured to retrieve the feedback associated with each of the one or more non-modified regions from a DFX results storage 220. In an embodiment, the feedback may include user action, analysis comments, and insights associated with each of the one or more non-modified regions. Further, the feedback retrieved from same regions of the previous version is mapped to a corresponding non-modified region of the one or more non-modified regions.

Further, for each of the one or more modified regions, the CAD similarity tracing module 218 may be configured to compare each of the one or more modified regions with the historical dataset. The historical dataset may include a signature associated with each of a plurality of existing CAD documents including an associated set of existing regions. Further, based on the comparison, the CAD similarity tracing module 218 may be configured to identify one or more similar existing regions correspond to each of the one or more modified regions. In an embodiment, when for a modified region, at least one existing region is identified, then the modified region is referred to as an analogous modified region. In another embodiment, when for a modified region, at least one existing region is not identified, then the modified region is referred to as a non-analogous modified region.

For each analogous modified region, the CAD design tracing module 214-2 may be configured to analyze and trace at least one existing region. In particular, the CAD design tracing module 214-2 may trace the signature of each analogous region to at least one existing region. The signature for each analogous region is generated by the CAD design signature generation module 208-1. In an embodiment, the CAD design signature generation module 208-1 may generate the signature for each analogous region based on attributes and geometry associated with each analogous region. Further, based on analysis, the analysis results tracing module 214-1 may be configured to retrieve the feedback associated with each analogous modified region from the DFX results storage 220. In an embodiment, the feedback retrieved for the analogous modified region may be associated with the corresponding existing region. Further, the feedback retrieved from the same regions is mapped to a corresponding analogous modified region. The analysis results tracing module 214-1 can retrieve archived results from the DFX Results storage 220.

Further, for each non-analogous modified region, the CAD design tracing module 214-2 may be configured to prompt the user to generate the feedback. In some embodiment, the CAD design tracing module 214-2 may be configured to analyze and trace each non-analogous modified region. In particular, the CAD design tracing module 214-2 may trace the signature of each analogous region and at least one existing region. The signature for each non-analogous region is generated by the CAD design signature generation module 208-1. In an embodiment, the CAD design signature generation module 208-2 may generate the signature for each non-analogous region based on attributes and geometry associated with each non-analogous region. Further, based on analysis, the analysis results tracing module 214-1 may be configured to prompt the user to generate the feedback for each non-analogous modified region. In some embodiment, the analysis results tracing module 214-1 may automatically generate the feedback for each non-analogous modified region. The analysis results signature generation module 208-2 is used to generate signature of the analysis results for each analogous modified region which are then stored in DFX Results storage 220.

In another embodiment, when the CAD file 204 is determined to be the new CAD file 204A, then in order to generate the feedback, the CAD similarity tracing module 218 may be configured to analyze the new CAD file 204A. The CAD similarity tracing module 218 may analyze the new CAD file 204A to generate feedback corresponding to each of the set of regions of the new CAD file 204A. As will be appreciated, since the CAD file 204 is the new CAD file 204A, therefore no non-modified regions may be present within the new CAD file 204A. However, the set of regions may belong to one of the analogous regions category or the non-analogous regions category. In an embodiment, the CAD similarity tracing module 218 may be configured to analyze the set of regions of the new CAD file 204A based on user requirements (or pre-defined user input). It should be noted that each of the set of regions of the new CAD file 204A may be modified regions. Further, since each of the set of regions are modified regions, therefore the feedback for each of the set of regions may generated using a similar technique as described above for each of the one or more modified regions of the updated CAD file 204B.

Figure 3:
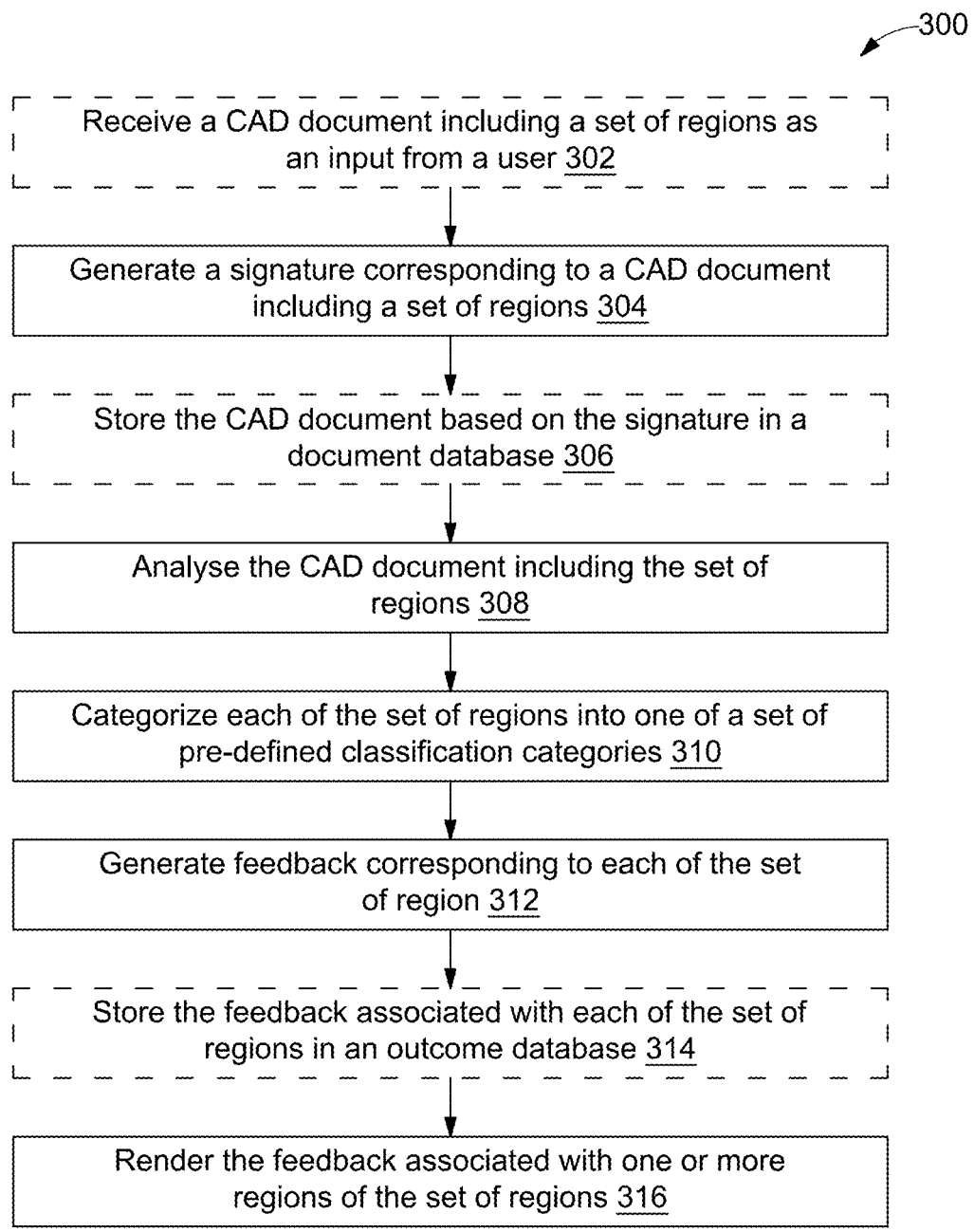
FIG. 3 illustrates a flowchart of a method for managing computer aided design (CAD) documents, in accordance with an embodiment.

Referring now to FIG. 3, a flowchart of a method 300 for managing computer aided design (CAD) documents is illustrated, in accordance with an embodiment. FIG. 3 is explained in conjunction with FIG. 1 and FIG. 2. Initially, at step 302, a CAD document may be received as an input from a user. It should be noted that the CAD document may correspond to a design document that the user might be interested in creating or modifying. Further, the user may be one of a design engineer, for example, senior design engineers, quality engineers, manufacturing engineers, industrialization engineers, and the like. In an embodiment, the CAD document may be one of a new CAD document or an existing CAD document. The new CAD document may correspond to a CAD document for which no previous version of the CAD document might exist. Further, the existing CAD document may correspond to a CAD document for which at least one previous version might exist. In an embodiment, the CAD document may include a set of regions. Further, each of the set of regions may correspond to a design region. With reference to FIG. 2, each CAD document along with its associated version may be stored with the CAD files version control database 206 (same as the database 114 of FIG. 1).

Upon receiving the CAD document, at step 304, a signature corresponding to the CAD document may be generated. In particular, the signature is generated corresponding to each of the set of regions present within the CAD document. Once the signature corresponding to the CAD document is generated, at step 306, the CAD document may be stored within a document database. The CAD document may be stored within the document database based on the generated signature. With reference to FIG. 2, the document database may correspond to the CAD files version control storage 206.

Further, at step 308, the CAD document may be analyzed. In particular, each of the set of regions present within the CAD document may be analyzed. In an embodiment, the CAD document may be analyzed based on the signature generated for the CAD document and an associated document type. The associated document type may be one of the new CAD document or the existing CAD document. By way of an example, if the CAD document being analyzed is the existing CAD document, then a current version of the CAD document may be analyzed in correspondence with a previous version of the CAD document. By way of another example, if the CAD document is the new CAD document, since no previous version of the CAD document may be available, therefore the CAD document may be analyzed based on previous versions of a plurality of existing CAD files. A method of analyzing the CAD document is further explained in conjunction with FIG. 4.

Upon analyzing the CAD document, at step 310, each of the set of regions within the CAD document may be categorized in one of a set of pre-defined classification categories. The set of pre-defined classification categories may include a modified regions category and a non-modified regions category. The modified regions category may further include an analogous regions category and a non-analogous regions category. As will be appreciated, the modified regions category may include regions of the CAD document in which changes have been made in a current version of the CAD document than its previous version, or a new set of regions of the new CAD document that has been created. Whereas the non-modified regions category may include regions of the CAD document in which no changes has been made in the current version of the CAD document in comparison with the previous version. A method of categorizing each of the set of regions into one of the set of pre-defined classification categories has been further explained in detail in conjunction with FIG. 5.

Once each of the set of regions of the CAD document is categorized into one of the set of pre-defined classification categories, then at step 312, feedback may be generated for each of the set of regions based on an associated classification category. By way of an example, in case when the CAD document is the existing document, and when a region of the set of regions was categorized into the non-modified regions category, then the feedback for this region within the current version of the CAD document will be same as the feedback provided for a corresponding region (same region) present within the previous version of the CAD document. In other words, initially, the corresponding region for the region in the current version of the CAD document may be identified within the previous version of the CAD document. Upon identifying the corresponding region, the feedback associated with the corresponding region within the previous version may be mapped to the region (non-modified) within the current version. As will be appreciated, the previous version may correspond to a last saved version of the CAD document. Whereas the current version may correspond to an updated version of the last version of the CAD document. This is further explained in detail in conjunction with FIG. 6.

By way of another example, the CAD document is the existing CAD document, and a region of the set of regions was categorized into the modified region category. In this case, since the region is a modified region, no previous feedback may be present for this region as no previous version of this CAD document may exist. Therefore, feedback may be generated, or a user may be prompted to input the feedback for the modified region that is categorized into the non-analogous regions category. Whereas, when the modified region is categorized into the analogous regions category, then the feedback associated with a corresponding region (i.e., the analogous region) present within previous version of at least one existing CAD document may be mapped to this modified region. A method of generating the feedback corresponding to the modified region is further explained in detail in conjunction with FIG. 7 to FIG. 9.

Once the feedback corresponding to each of the set of regions is generated, then at step 314, the feedback associated with each of the set of regions may be stored in an outcome database. With reference to FIG. 2, the outcome database may correspond to the DFX results storage 220. The feedback associated with each of the set of regions may be stored in the outcome database for future reference. By way of an example, upon receiving a new version of the CAD document, the feedback provided for the set of regions present with the previous version of the CAD document may be easily mapped based on comparison. In addition, the user (design reviewer) needs to provide feedback only for modified regions identified within the new version.

By way of another example, in case of the new CAD document, the feedback stored within the outcome database may enable easy mapping of the feedback associated with regions within existing CAD documents that are same with one or more regions within the new CAD document. This will save a lot of time of design reviewers that otherwise require manually reviewing of each region of the CAD document every time, in case of an update in the existing region or a newly created CAD document including same regions as of regions within the existing CAD documents. In addition, the feedback generated for each of the set of regions may be rendered to the user as mentioned at step 316. A method of rendering the feedback is further explained in detail in conjunction with FIG. 10 and FIG. 11. This complete method of managing the CAD document is further explained in detail in conjunction with FIG. 12.

Figure 4:
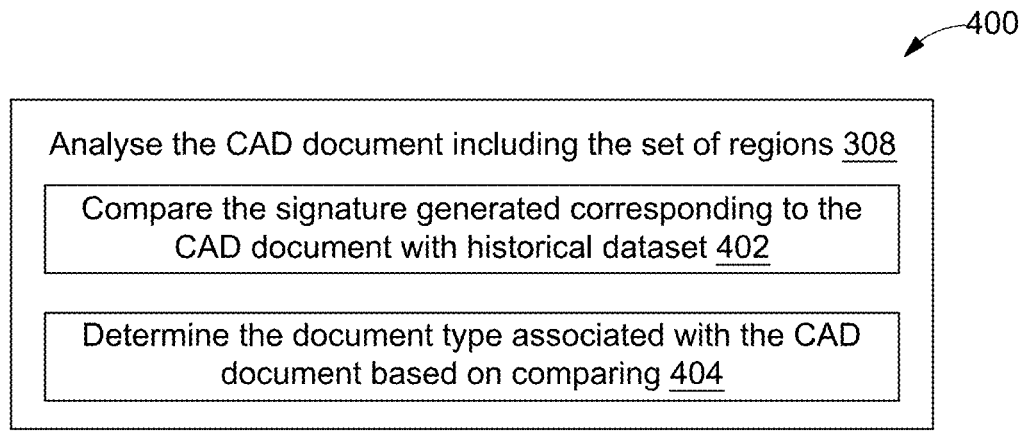
FIG. 4 illustrates a flowchart of a method for analyzing a CAD document, in accordance with an embodiment.

Referring now to FIG. 4, a flowchart of a method 400 for analyzing a CAD document is illustrated, in accordance with an embodiment. FIG. 4 is explained in reference to FIGS. 1-3. In order to analyze the CAD document, as mentioned via the step 308, initially at step 402, the signature generated corresponding to the CAD document may be compared with historical dataset. In an embodiment, the historical dataset may include a signature associated with each of the plurality of existing CAD documents. Further, each of the plurality of existing CAD documents may include an associated set of existing regions. By way of example, upon receiving the CAD document as the input from the user (e.g., design reviewer), initially, the signature may be generated for the CAD document. Once the signature is generated, the signature generated for the CAD document may be compared with the signature associated with each of the plurality of existing CAD documents.

Further, based on comparison, at step 404, the document type associated with the CAD document may be determined. For example, in order to determine the document type of the CAD document, the signature generated for the CAD document may be compared with the signature associated with each of the plurality of existing CAD documents. Further, based on comparison, when the signature associated with the CAD document matches with a signature associated with an existing CAD document, then the CAD document is determined to be an updated version of the existing CAD document. In other words, the CAD document is determined to be the existing CAD document.

By way of an example, consider a scenario, where a pre-defined matching threshold (say: 50%) may have been defined for matching the signature being generated for the CAD document. Further, based on comparison, when a matching threshold value between the signature generated for the CAD document and a signature associated with an existing CAD document is determined to be above then the pre-defined matching threshold (say: 90%), then the existing CAD document may be determined to be the previous version of the CAD document. In this scenario, based on the determined matching threshold value, the CAD document may be determined to be the existing CAD document. By way of another example, based on comparison, when a matching threshold value between the signature generated for the CAD document and the signature associated with each of the plurality of existing CAD documents is determined to be below then the pre-defined threshold (say: 20%), then the CAD document may be determined to be the new CAD document.

Figure 5:
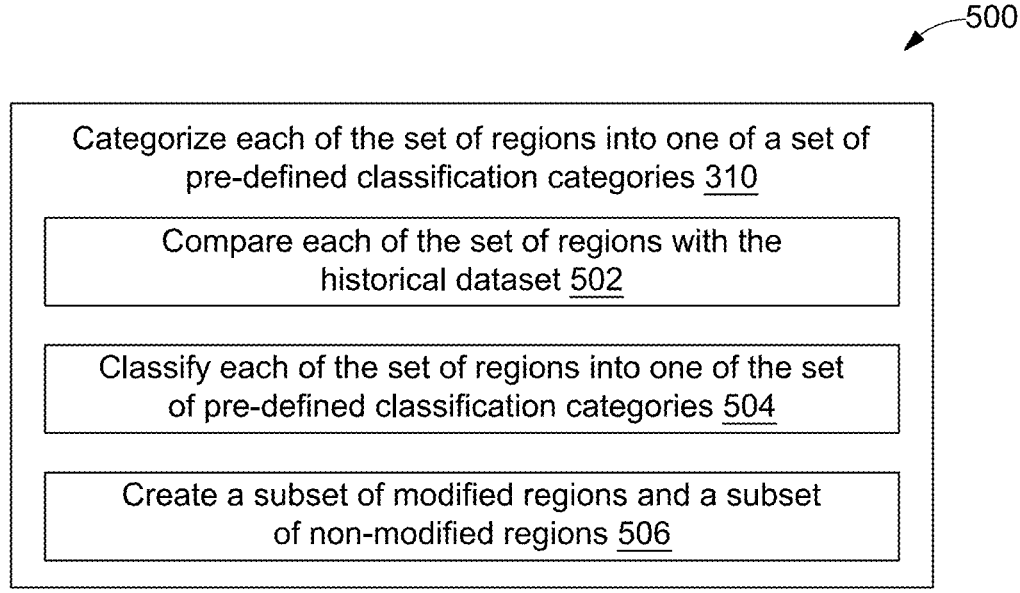
FIG. 5 illustrates a flowchart of a method of categorizing each of a set of regions, in accordance with an embodiment.

Referring now to FIG. 5, a flowchart of a method 500 of categorizing each of a set of regions is illustrated, in accordance with an embodiment. FIG. 5 is explained in conjunction with FIGS. 1-4. In order to categorize each of the set of regions present within the CAD document into one of the set of pre-defined classification categories as mentioned via the step 310, initially, at step 502, each of the set of regions may be compared with the historical dataset. The historical dataset may include the signature associated with each of the plurality of existing CAD documents. It should be noted that each of the plurality of existing CAD documents may include the associated set of existing regions. By way of an example, in a scenario where the CAD document is determined to be the existing CAD document, then each of the set of regions within the CAD document may be compared with each of a set of existing regions present within the previous version of the CAD document. It should be noted that, the previous version of the CAD document may be part of historical dataset. By way of another example, in a scenario where the CAD document is determined to be the new CAD document, then each of the set of regions within the CAD document may be compared with each of the set of existing regions present within each of the plurality of existing CAD documents.

Further, based on the comparison, at step 504, each of the set of regions may be classified into one of the set of pre-defined classification categories. In an embodiment, each of the set of regions may be classified into one of the set of pre-defined classification categories based on a pre-defined similarity threshold. A similarity value of the one or more modified regions may be below than the pre-defined similarity threshold. In addition, a similarity value of the one or more non-modified regions may be above the pre-defined similarity threshold.

The set of pre-defined classification categories may include the modified regions category and the non-modified regions category. The modified regions category may further include the analogous regions category and the non-analogous regions category. As will be appreciated, the modified regions category may include regions of the CAD document in which changes have been made in the current version of the CAD document than its previous version. Whereas the non-modified regions category may include regions of the CAD document in which no changes has been made in the current version of the CAD document in comparison with the previous version.

In continuation to above example, in the scenario where the CAD document is the existing CAD document, each region of the set of regions of the current version of CAD document may be matched with each region of the set of existing regions of the previous version. In first case, based on the matching, when a similarity value between a region of the current version and an existing region of the previous version is above then the pre-defined similarity threshold (say: 95%), then the region may be determined to be same as the existing region. Further, based on determining, the region may be categorized into the non-modified regions category.

In second case, based on the matching, when a pre-defined similarity value of between a region of the set of regions of the current version and each of the set of existing regions of the previous version is below then the pre-defined similarity threshold (say: 95%), then the region may be determined to be same as the modified region. Further, based on determining, the region may be categorized into the modified regions category. The region categorized in the modified regions category may be further categorized into either the analogous regions category or the non-analogous regions category. For this, the region categorized in the modified regions category may be matched with each existing region of each of the plurality of existing CAD documents.

Further, based on the matching, if the pre-defined similarity value between the region and an existing region is determined to be above than a pre-defined similarity threshold, the region may be determined to be analogous to the existing region and is categorized within the analogous regions category. Furthermore, based on the matching, if the pre-defined similarity value between the region and each of the set of existing regions is determined to be below than the pre-defined similarity threshold, the region may be determined to be non-analogous and is categorized within the non-analogous regions category.

In continuation to another example, in the scenario where the CAD document is the new CAD document, each region of the set of regions of the current version of the CAD document may be compared (or matched) with each region of the set of existing regions of each of the plurality of existing CAD documents. Further, based on the comparison, if the pre-defined overlapping value between a region and an existing region is determined to be above than the pre-defined overlapping threshold, then the region may be determined to be analogous to the existing region and is categorized within the analogous regions category. Furthermore, based on the comparison, if the pre-defined overlapping value between the region and each of the set of existing regions is determined to be below than the pre-defined similarity threshold, then the region may be determined to be a non-analogous region and is categorized within the non-analogous regions category.

Once each of the set of regions is classified into one of the set of pre-defined classification categories, then at step 506, a subset of modified regions and a subset of non-modified regions may be created. In an embodiment, the subset of modified regions may include one or more modified regions of the set of regions. In addition, the subset of non-modified regions may include one or more non-modified regions of the set of regions based on the associated classification category.

Figure 6:
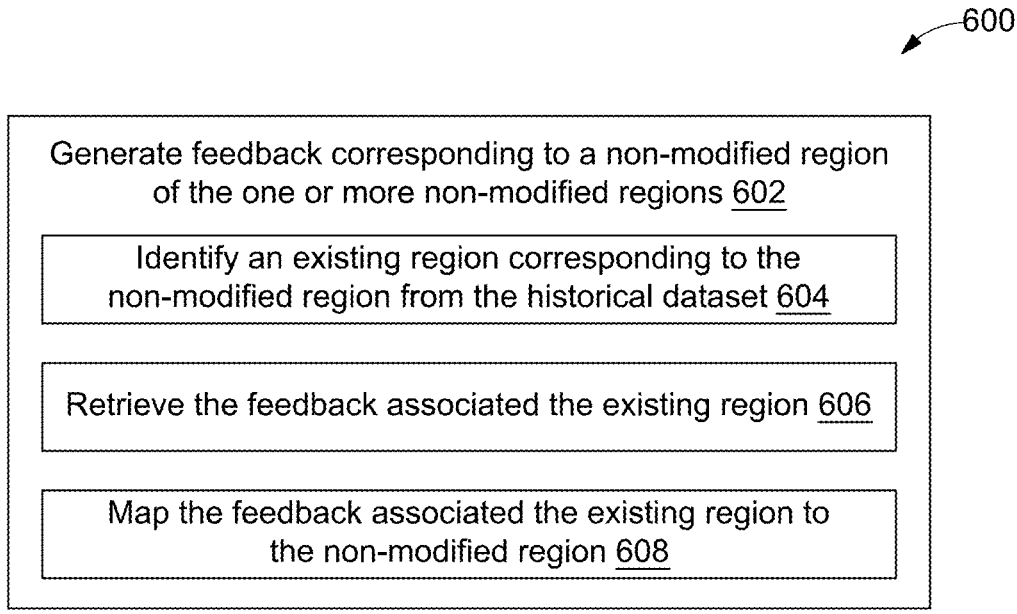
FIG. 6 illustrates a flowchart of a method of generating feedback corresponding to a non-modified region, in accordance with an embodiment.

Referring now to FIG. 6, a flowchart of a method 600 of generating feedback corresponding to a non-modified region is illustrated, in accordance with an embodiment. FIG. 6 is explained in conjunction with FIGS. 1-5. Once the subset of non-modified regions including one or more non-modified regions is created as mentioned via step 506, then in order to generate feedback corresponding to a non-modified region of the one or more non-modified regions as mentioned via step 602, at step 604, an existing region corresponding to the non-modified region may be identified from the historical dataset. The historical dataset may include the signature associated with each of the plurality of existing CAD documents including the associated set of existing regions.

In an embodiment, the existing region may be same as the non-modified region. Once the existing region corresponding to the non-modified region is identified, then at step 606, the feedback associated with the existing region may be retrieved. Upon retrieving the feedback associated with the existing region, at step 608, the feedback associated with the existing region may be mapped to the non-modified region. By way of an example, consider a scenario where the CAD document is identified to be the existing CAD document. In this scenario, based on comparing of each of the set of regions of the current version of CAD document with each region of the set of existing regions of the previous version of the CAD document, the one or more non-modified regions may be identified and classified into the non-modified regions category.

Further, based on classification, the subset of non-modified regions including the one or more non-modified regions may be created. Once each of the one or more non modified regions is categorized, then each non-modified region of the one or more non-modified regions may be compared against each of the set of existing regions within the previous version of the CAD document. In an embodiment, the comparison may be done to identify the existing region that is identical (exactly same) to the non-modified region. As will be appreciated, the existing region may be considered as identical to the non-modified region, when the existing region completely (100%) matches with the non-modified region. Upon identifying the existing region corresponding to the non-modified region, the feedback associated with the existing region may be retrieved.

It should be noted that the feedback associated with the existing region may be provided by a user (e.g., design engineer) while analyzing previous version of the CAD document. In some embodiment, the user analyzing the previous version may be an ex-employee of an organization. While the user performing analysis of the current version of the CAD document may be a current employee of the organization. Once the feedback associated with the existing region that is identical to the non-modified region is retrieved, then the retrieved feedback may be mapped to the non-modified region. As will be appreciated, for ease of explanation, the feedback generation for one non-modified region is explained. However, in a similar way, the feedback may be generated for each of the one or more non-modified regions identified from the set of regions of the CAD document.

Figure 7:
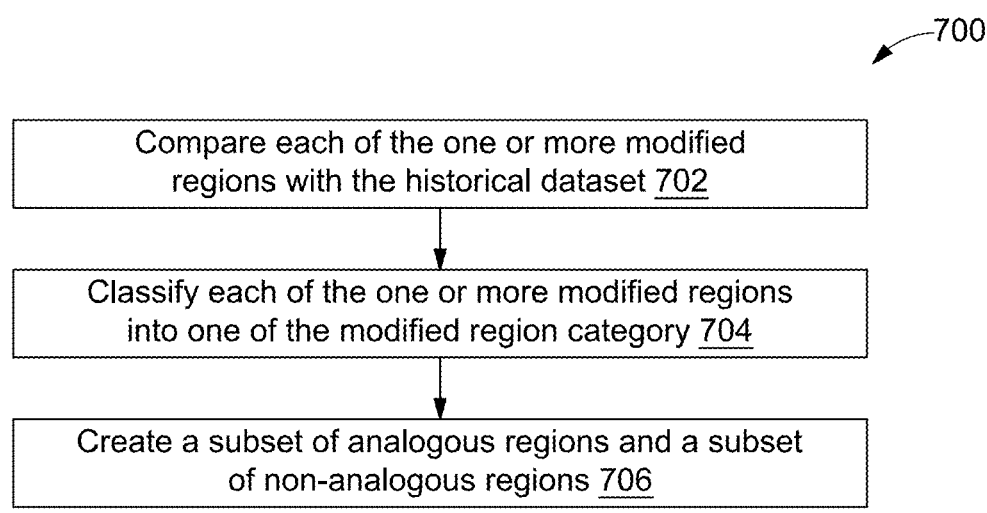
FIG. 7 illustrates a flowchart of a method of identifying analogous and non-analogous regions from one or more modified regions, in accordance with an embodiment.

Referring now to FIG. 7, a flowchart of a method 700 of identifying analogous and non-analogous regions from one or more modified regions is illustrated, in accordance with an embodiment. FIG. 7 is explained in conjunction with FIGS. 1-6. Once the subset of modified regions including the one or more modified regions is created, as mentioned via step 506, then at step 702 each of the one or more modified regions may be compared with the historical dataset. In an embodiment, the historical dataset may include the signature associated with each of the plurality of existing CAD documents including the associated set of existing regions. Further, based on comparing, at step 704, each of the one or more modified regions may be classified as one of the analogous region or the non-analogous region. In an embodiment, the classification of each of the one or more modified regions into the analogous region or the non-analogous region may be done based on the pre-defined overlapping threshold.

Further, based on classification, at step 706, the subset of analogous regions and the subset of non-analogous regions may be created based on the associated modified region category. In an embodiment, the subset of analogous regions may include one or more analogous modified regions. Further, the subset of non-analogous regions may include one or more non-analogous modified regions.

By way of an example, consider a scenario where the CAD document is the existing document. In such case when the one or more non-modified regions from the set of regions within the CAD document are identified, then remaining regions within the set of regions may be classified as the modified regions within the modified region category. This is because none of the set of existing regions of the previous version of the CAD document may be identical to the remaining regions of the current version of the CAD document. By way of another example, consider a scenario where the CAD document is identified as the new CAD document. In such case, since any previous version of the new CAD document might not be available, therefore each of the set of regions within the CAD document may be classified as the modified regions within the modified region category.

In both the scenarios, for each modified region, a modified region of the one or more modified regions may be compared with the historical dataset. In particular, each modified region may be compared with each of the set of existing regions of each of the plurality of existing CAD documents. Further, based on the comparison, if the pre-defined overlapping value between the modified region and an existing region is determined to be above than the pre-defined overlapping threshold, then the modified region may be determined to be analogous to the existing region. In particular, based on the comparison, when the pre-defined overlapping value between the modified region and the existing region is above than the pre-defined overlapping threshold, then the modified region may be the analogous modified region and is categorized within the analogous region category.

Furthermore, based on the comparison, if the pre-defined overlapping threshold between the modified region and each of the set of existing regions is determined to be below than the pre-defined overlapping threshold, then the modified region may be determined to be non-analogous to each of the set of existing regions.

As will be appreciated, for ease of explanation, the classification of one modified region is explained. However, in a similar way, each of the one or more modified regions may classified into one of the analogous regions category or the non-analogous regions category. Once each of the one or more modified regions are classified, then the subset of analogous regions and the subset of non-analogous regions may be created based on the associated modified regions category. The subset of analogous regions may include one or more analogous modified regions. The subset of non-analogous regions may include one or more non-analogous modified regions.

Figure 8:
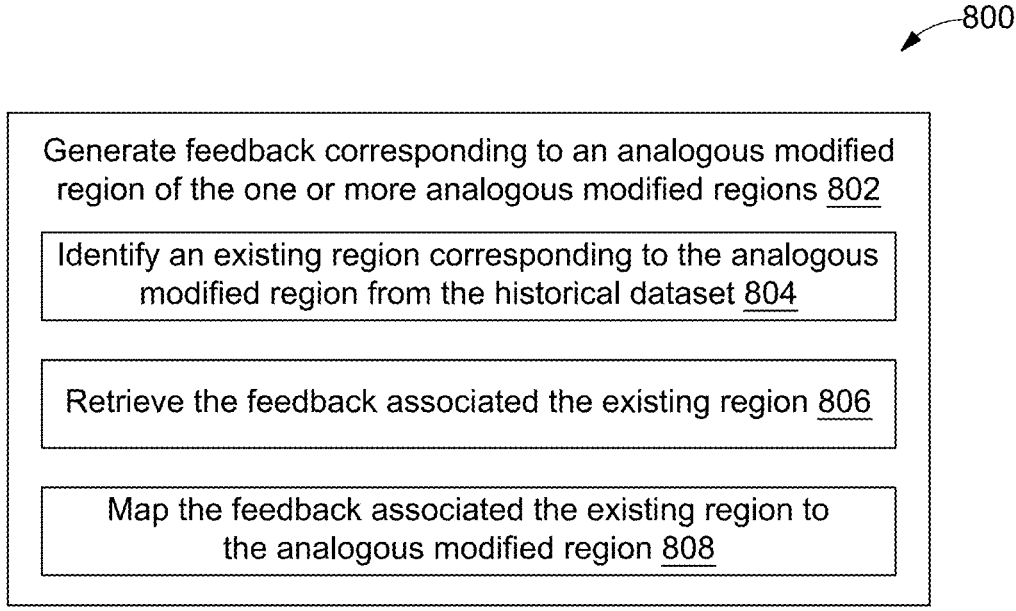
FIG. 8 illustrates a flowchart of a method of generating feedback corresponding to an analogous region, in accordance with an embodiment.

Referring now to FIG. 8, a flowchart of a method 800 of generating feedback corresponding to an analogous modified region is illustrated, in accordance with an embodiment. FIG. 8 is explained in conjunction with FIGS. 1-7. Once the subset of analogous regions including the one or more analogous modified regions is created as mentioned via the step 706, then the feedback corresponding to each of the one or more analogous modified regions may be generated. In order to generate the feedback corresponding to the analogous modified region of the one or more analogous modified regions as mentioned via the step 802, at step 804, an existing region may be identified corresponding to the analogous modified region from the historical dataset. The existing region may be same as the analogous modified region. In addition, the historical dataset may include the signature associated with each of the plurality of existing CAD documents including the associated set of existing regions.

In an embodiment, the existing region corresponding to the analogous modified region may be identified by comparing the analogous modified region with each of the set of existing regions present within each of the plurality of CAD documents. Upon identifying the existing region that is same as the analogous modified region from the historical dataset, at step 806, the feedback associated the existing region may be retrieved. Once the feedback associated with the existing region is retrieved, at step 808, the feedback associated with the existing region may be mapped to the analogous modified region.

By way of an example, when the one or more analogous modified regions are identified, then each analogous modified region may be compared with each region of the set of existing regions. In an embodiment, a set of existing regions of the set of existing regions be associated with an existing CAD document of the plurality of existing CAD documents. In an embodiment, the comparison may be done to identify the existing region that is identical (same) to the analogous modified region. As will be appreciated, the existing region may be considered as identical to the analogous modified region, when the existing region completely matches with the analogous modified region. Upon identifying the existing region corresponding to the analogous modified region, the feedback associated with the existing region may be retrieved.

It should be noted that the feedback associated with the existing region may be provided by a user (e.g., design engineer) while analyzing the existing CAD document to which the existing region belongs. Once the feedback associated with the existing region that is identical to the analogous modified region is retrieved, then the retrieved feedback may be mapped to the analogous modified region. As will be appreciated, for ease of explanation, the feedback generation for one analogous modified region is explained. However, in a similar way, the feedback may be generated for each of the one or more analogous modified regions identified from the one or more modified regions within the CAD document.

Figure 9:
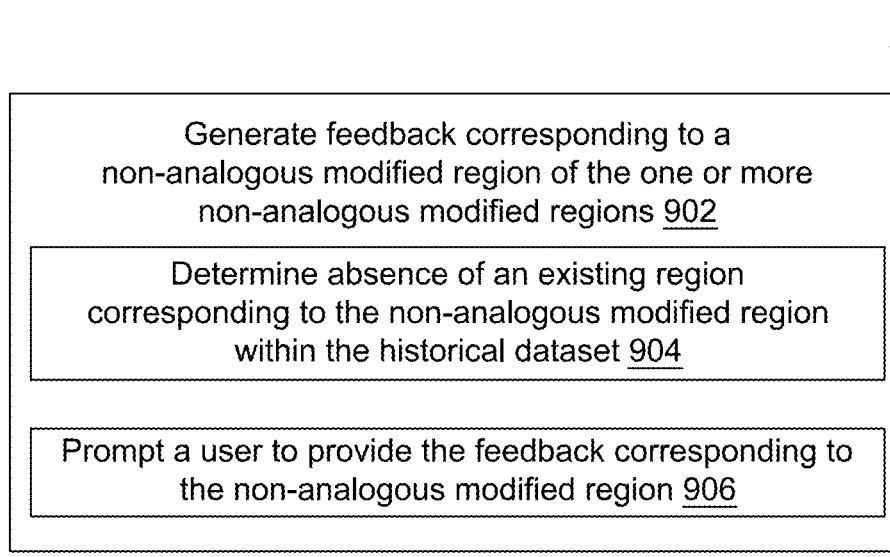
FIG. 9 illustrates a flowchart of a method of generating feedback corresponding to a non-analogous modified region, in accordance with an embodiment.

Referring now to FIG. 9, a flowchart of a method 900 of generating feedback corresponding to a non-analogous modified region is illustrated, in accordance with an embodiment. FIG. 9 is explained in conjunction with FIGS. 1-8. Once the subset of non-analogous regions including the one or more non-analogous modified regions is created as mentioned via the step 706, then the feedback corresponding to each of the one or more non-analogous modified regions may be generated. In order to generate the feedback corresponding to the non-analogous modified region of the one or more non-analogous modified regions as mentioned via the step 902, at step 904, absence of an existing region corresponding to the non-analogous modified region within the historical dataset may be determined.

By way of an example, the absence of the existing region corresponding to the non-analogous modified region may be determined by comparing the non-analogous modified region against each of the set of existing regions. It should be noted that each of the set of existing regions may be present within the plurality of existing CAD documents. In addition, each of the plurality of existing CAD documents may be part of the historical dataset. Further, based on the comparison, when none of the set of existing regions matches with the non-analogous modified region, the determination is made that the existing region corresponding to the non-analogous modified region is not present within the historical dataset. Upon determining the absence of the existing region, at step 906, the user may be prompted to provide the feedback corresponding to the non-analogous modified region.

In other words, since none of set of existing region matches with the non-analogous region, therefore, the feedback corresponding to the non-analogous region may not be present within the historical dataset. Further, since the feedback corresponding to the non-analogous modified region is not available, therefore, the user (i.e., the design engineer) may be prompted to generate the feedback for the non-analogous modified region. In some embodiment, the computing device 102 may be configured to automatically generate the feedback for each non-analogous modified region. As will be appreciated, for ease of explanation, the feedback generation for one non-analogous modified region is explained. However, in a similar way, the feedback may be generated for each of the one or more non-analogous modified regions identified from the one or more modified regions within the CAD document.

Figure 10:
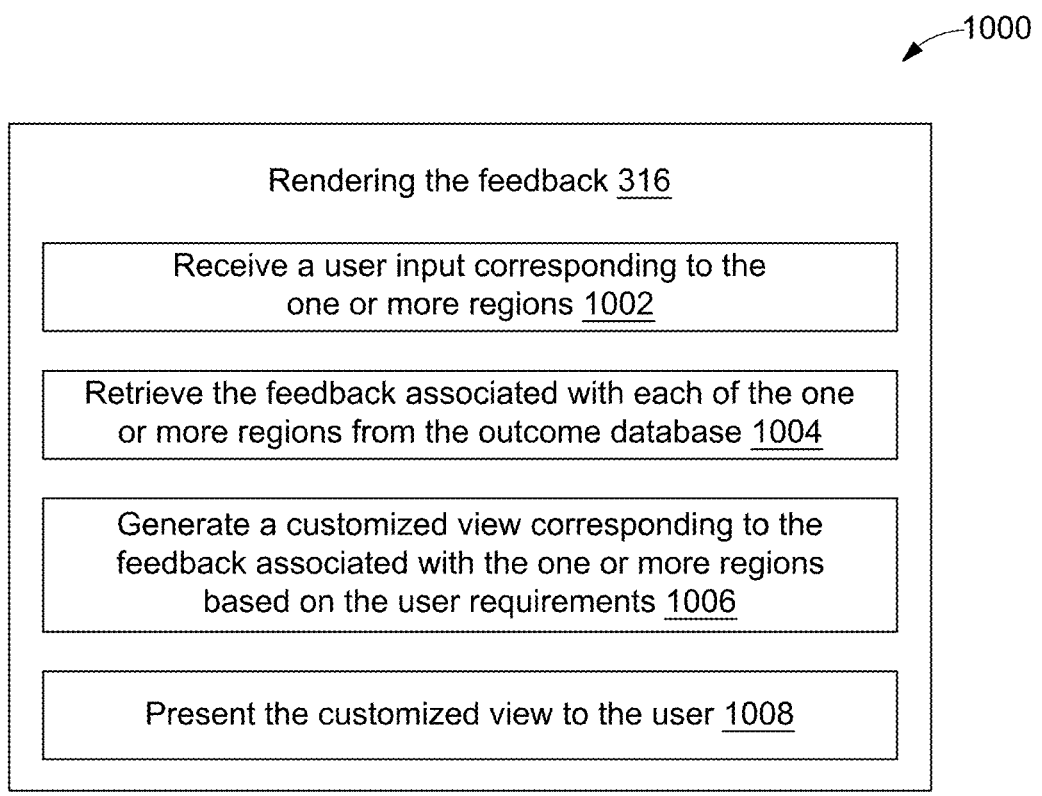
FIG. 10 illustrates a flowchart of a method of rendering feedback to a user, in accordance with an embodiment.

Referring now to FIG. 10, a flowchart of a method 1000 of rendering feedback to a user is illustrated, in accordance with an embodiment. FIG. 10 is explained in conjunction with FIGS. 1-9. Once the feedback corresponding to each of the set of regions within the CAD document is generated and stored as mentioned via the step 310 and step 312, then the feedback corresponding to one or more regions may be rendered to the user based on the requirement. In order to render the feedback as mentioned via the step 316, at step 1002, a user input corresponding to the one or more regions may be received. In an embodiment, the user may be able to select the one or more regions based on his requirement.

For example, consider a scenario when the CAD document received as the input is a new version of the existing CAD document. Further, in this scenario, suppose the user is only interested in viewing regions that have been modified in comparison with the previous version. In order to view only the modified regions, the user may be able to provide the user input with respect to one or more modified regions that the user might be interested in viewing. Upon receiving the user input, at step 1004, the feedback associated with each of the one or more regions may be retrieved from the outcome database. Further, at step 1006, a customized view may be generated. The customized view may include the feedback associated with the one or more regions based on the user requirements. Once the customized view is generated, then at step 1008, the customized view may be presented to the user via a Graphical User Interface (GUI) (same as the UI 110). This method for rendering the feedback to the user is further explained in detail in conjunction with FIG. 11.

Figure 11:
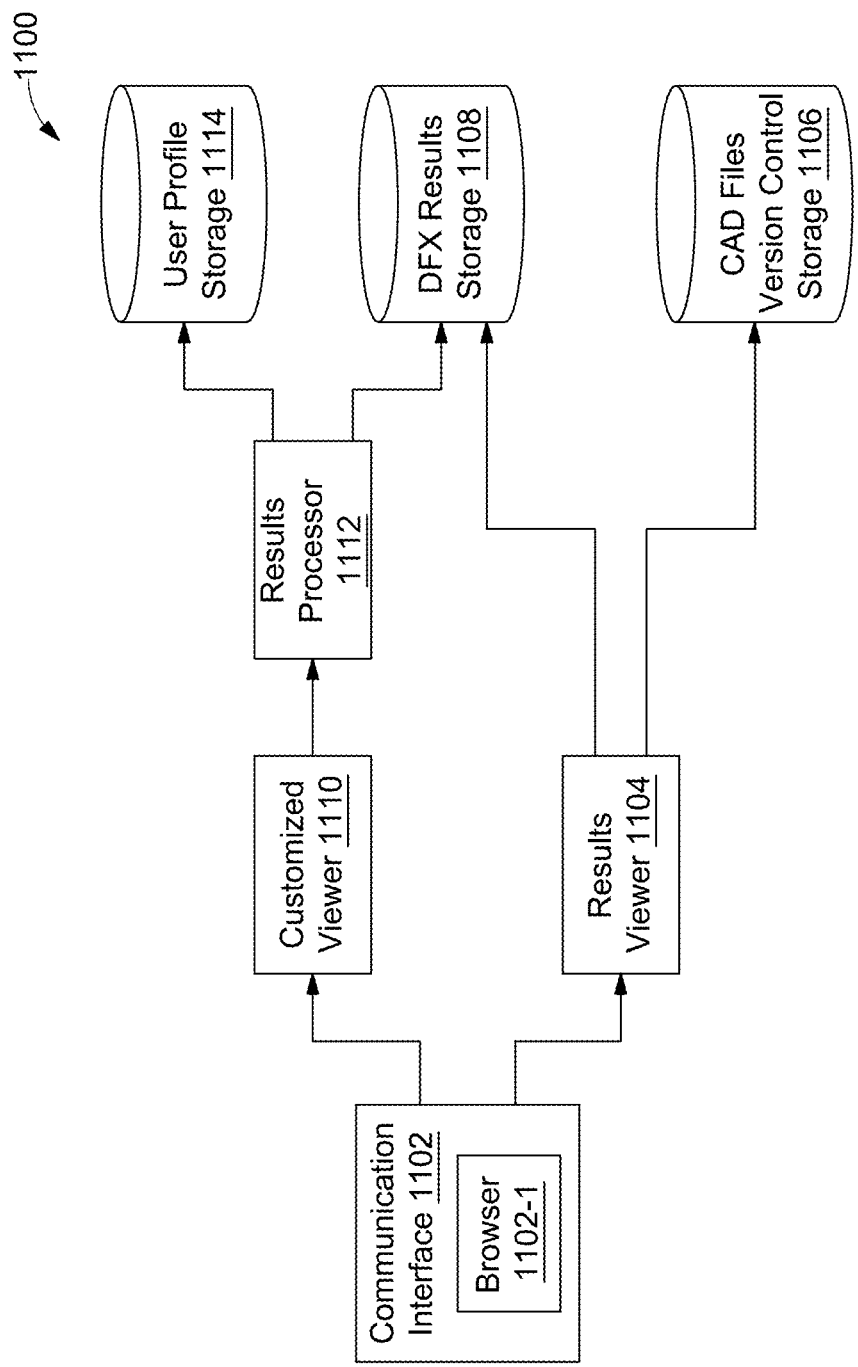
FIG. 11 illustrates a block diagram of additional modules within a memory of a computing device configured for rendering feedback to a user, in accordance with an embodiment.

Referring now to FIG. 11, a block diagram 1100 of additional modules within the memory 104 of the computing device 102 configured for rendering feedback to a user is illustrated, in accordance with an embodiment. FIG. 11 is explained in conjunction with FIGS. 1-10. The additional module included within the memory 104 may include a results viewer 1104, a customized viewer 1110, and a results processor 1112. Further, a CAD files version control storage 1106 (same as the CAD files version control storage 206), a DFX results storage 1108 (same as DFX results storage 220), and users profile storage 1114 may correspond to the database 114. In order to render the feedback associated with the CAD document to the user, initially, the user input corresponding to the set of regions may be received. In an embodiment, the user may provide the input via a communication interface 1102 (same as the UI 110) of a computing device (same as the computing device 102). In some embodiment, the user may provide the input using the external devices 118. In order to provide the input, the user may open a browser 1102-1 or an electronic mail (email) in the browser 1102-1 on his communication interface 1102.

By way of an example, when the user is interested in viewing the feedback associated with each of the set of regions of the CAD document, then the feedback associated with each of the set of regions may be rendered to the user via a results viewer 1104. In order to render the feedback associated with each of the set of regions, the results viewer 1104 may retrieve information about version of that CAD document from the CAD files version control storage 1106. In addition to retrieving the version, the results viewer 1104 may retrieve feedback associated with that version of the CAD document from the DFX results storage 1108.

By way of another example, when the user is interested in viewing the feedback associated with one or more regions of the set of regions of the CAD document, then the feedback associated with the one or more regions may be rendered to the user via a customized viewer 1110. In order to render the feedback associated with each of the one or more regions, the results processor 1112 may retrieve information about the user from the users' profile storage 1114. In addition to retrieving user's information, the results processor 1112 may retrieve the feedback associated with each of the one or more regions from the DFX results storage 1108.

Once the information about the user and the feedback associated with the one or more regions is retrieved, then the results processor 1112 may be configured to generate the customized view for the user. Further, the generated customized view may be rendered to the user via the customized viewer 1110. In an embodiment, the user interested in viewing the feedback may be from different user's profile, such as, design engineer, subject matter expert, reviewer, and manager. Since the user may have different profiles, hence creating the customized view of the feedback associated with regions of CAD documents that the user is interested in viewing pertaining to his/her goals is time saving, as each user may not be interested in viewing feedback that is of no use to him.

For instance, consider a scenario in which a design engineer may be interested in seeing only those regions that might have been affected and captured by the computing device 102 due to his/her new design changes in some regions of the CAD document. Additionally, association of newly created regions with similar regions from the DFX Results storage 1108 supplements the design engineer with information on the feedback that were provided in past analysis.

For instance, consider another scenario in which a design reviewer is only interested in reviewing newly generated regions and lookups (i.e., the feedback) for similar existing regions taken. The newly generated similar regions are supplemented with previous feedback (i.e., actions and review comments) provided for similar existing regions thereby shortening time taken for reviewing these newly generated regions. Further, usage of the computing device 102 also educates the design engineer on possible actions required in a timely manner. The communication interface 1102 may include an advanced option that enables the design reviewer to quickly load and analyze the regions of the CAD document without explicitly opening the CAD document. The design reviewer may also provide the feedback via the communication interface 1102 of the computing device which gets stored in the DFX Results storage 1108.

Figure 12A:
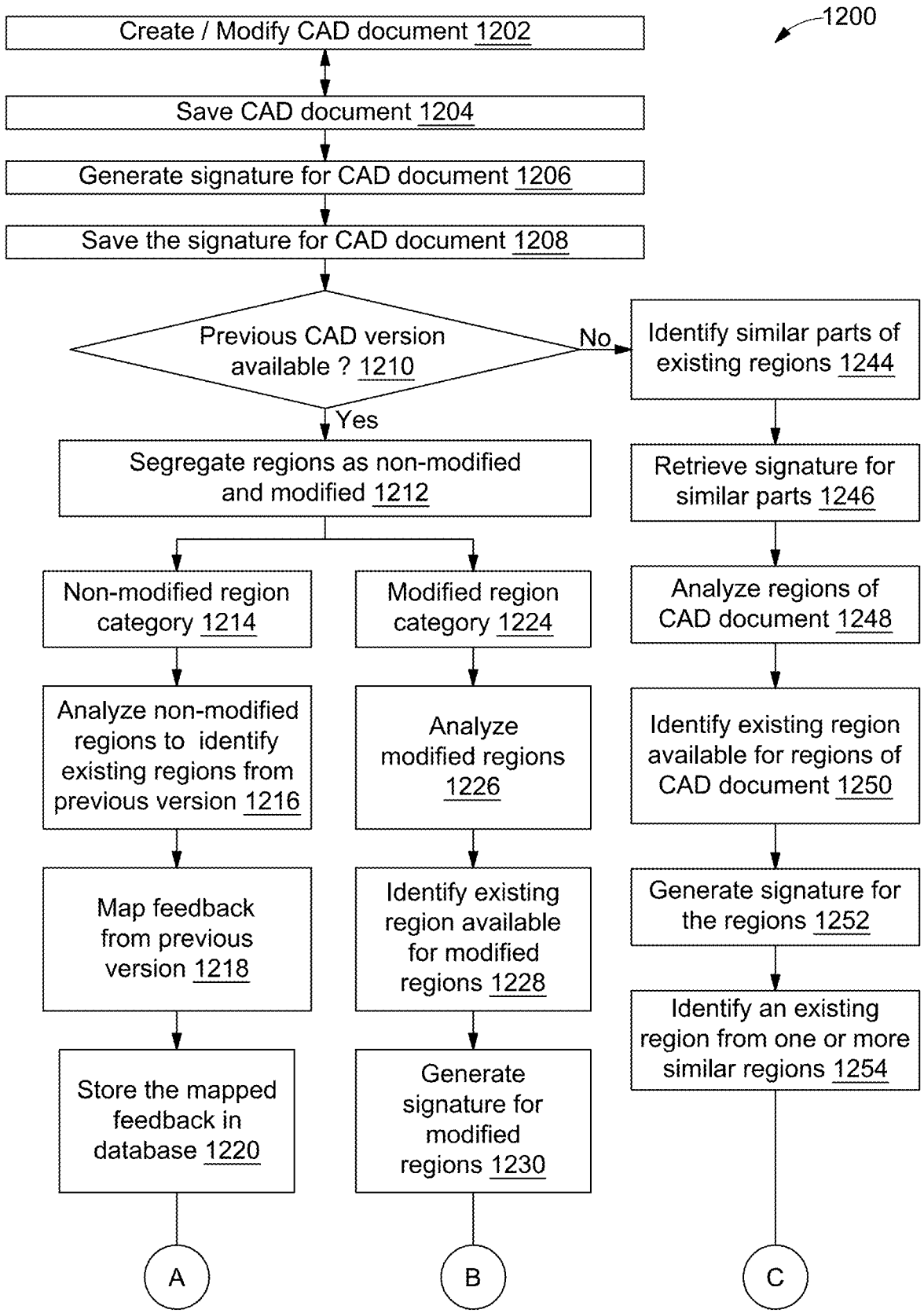
FIGS. 12A-12B illustrate a detailed flowchart of a method of managing CAD documents, in accordance with an embodiment.
Figure 12B:
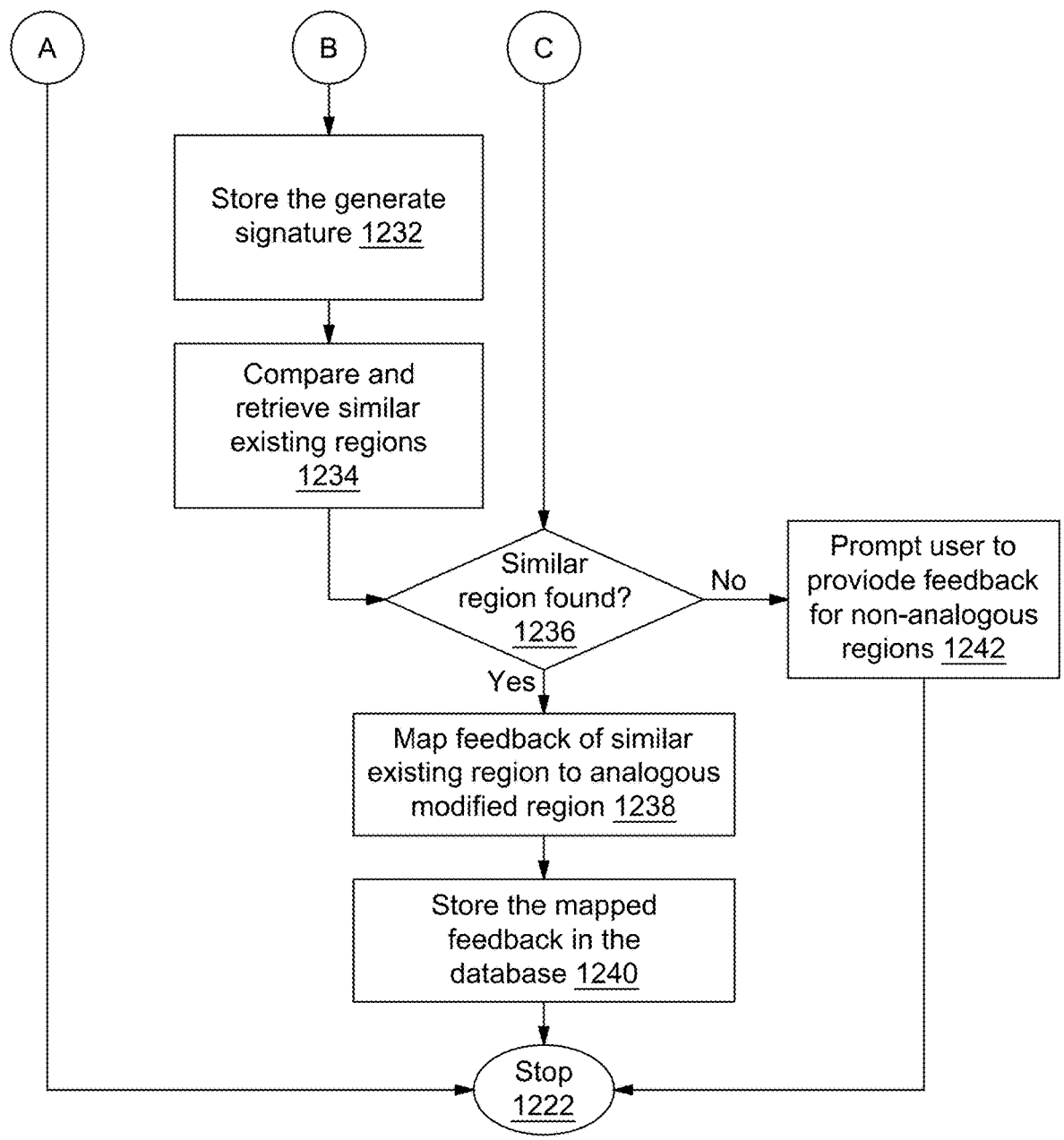

Referring now to FIGS. 12A-12B, a detailed flowchart of a method 1200 of managing CAD documents is illustrated, in accordance with an embodiment. FIG. 12 is explained in conjunction with FIGS. 1-11. Each step of the method 1200 may be performed by various modules store within the memory 104 of the computing device 102.

In order to manage the CAD document, initially, at step 1202, an input corresponding to the CAD document (CAD design document) may be received from the user. In one embodiment, the user may provide an input of selection of the CAD document for creation of the new CAD document. In another embodiment, the user may provide an input for selection of the existing CAD document to modify the existing CAD document.

Upon receiving the input of the CAD document, at step 1204, the received document may be saved within the CAD files version control database 206. The CAD document may be stored in the CAD files version control database 206 based on the version of the CAD document received as input. By way of an example, when the new CAD document is received, then the new CAD document may be saved with a version, for example: say CAD 10.1. In the version, "CAD 10.1", '10' represents 10th CAD document, whereas '1' represents first version of the CAD document. By way of another example, when the existing CAD document is received for modification, then the existing CAD document may be saved with a version, for example: say CAD 8.2. In the version, "CAD 8.2", '8' represents 8th CAD document, whereas '2' represents second version of the CAD document.

Upon receiving the CAD document as the input, at step 1206, the signature corresponding to the CAD document may be generated. Once the signature is generated, at step 1208, the signature corresponding to the CAD document may be stored within the CAD design signatures storage 210. The signature generated for the CAD document may be saved to the CAD design signatures storage 210 for further correlation and comparison during design analysis for CAD documents.

Once the signature for the CAD document is generated and stored, then at step k, a check may be performed to identify if a previous version for the CAD document is available or if the CAD document is the new document. In one embodiment, based on the check performed, when the CAD document is the existing CAD document and the previous version of the CAD document exist, then at step 1212, each of the set of regions of the CAD document may be segregated. In particular, each of the set of regions may be segregated into one of the set of pre-defined classification categories. The set of pre-defined classification categories may include a modified regions category 1224 and a non-modified regions category 1214. The modified regions category 1224 may further include the analogous regions category and the non-analogous regions category. As will be appreciated, each of the set of regions may be classified based on the pre-defined similarity threshold.

Upon segregation of the set of regions into the associated pre-defined classification category, two subsets may be generated, i.e., the subset of modified regions that includes the one or more modified regions of the set of regions, and the subset of non-modified regions that includes one or more non-modified regions of the set of regions. Further, for each of the one or more non-modified regions categorized under the non-modified regions category 1214, at step 1216, the corresponding existing region may be identified from the previous version of the CAD document. Upon identifying the existing region for each of the one or more non-modified regions, at step 1218, the feedback associated with the corresponding existing region may be mapped to the non-modified region of the one or more non-modified regions.

Once the feedback associated with each of the one or more non-modified regions in the current version of the CAD document is mapped from the previous version, then at step 1220, the feedback may be stored in a database (same as the outcome database or the DFX results storage 220). Once the feedback for each of the one or more non-modified regions are mapped and no more non-modified regions are left for mapping the feedback, then this process of mapping the feedback to the non-modified region may stop as mentioned via step 1222.

Further, at step 1226, each of the one or more modified regions may be analyzed. In an embodiment, each of the one or more modified regions may be analyzed to identify an existing region corresponding to the one or more modified regions as mentioned via step 1228. In order to identify the existing region corresponding to the one or more modified regions, at step 1230, a signature for each of the one or more modified regions may be generated. The generated signature may be stored in the DFX results storage 220 as mentioned via the step 1232.

Once the signature is generated and stored, then at step 1234, each of the one or more modified regions may be compared with the historical dataset. In particular, the signature generated for each of the one or more modified regions may be compared with the signature associated with each of the set of existing regions of each of the plurality of existing CAD documents. With reference to FIG. 2, the historical dataset may be stored within the DFX results storage 220. The comparison may be done to identify any existing similar to the one or more regions.

Further, at step 1236, a check may be performed to identify if the existing region corresponding to the one or more modified regions exists within the DFX results storage 220. Further, in first case, based on the check performed, when the existing region corresponding to the modified region of the one or more modified region is identified, then the modified region is categorized as the analogous modified region under the analogous regions category. Furthermore, in second case, based on the check performed, when the existing region corresponding to the modified region of the one or more modified region is not identified, then the modified region is categorized as the non-analogous modified region under the non-analogous regions category.

In the first case, for each analogous modified region within the analogous regions category, at step 1238, the feedback associated with the corresponding existing region may be retrieved from the database (same as the outcome database or the DFX results storage 220) and mapped to the analogous modified region. Further, at step 1240, the feedback mapped to the analogous modified region may be stored within the database (same as the outcome database or the DFX results storage 220). Once the feedback for each analogous modified region is mapped, then this process of mapping the feedback may be stopped as mentioned via step 1222. In the second case, for each non-analogous modified region within the non-analogous regions category, at step 1242, the user (e.g., the designer reviewer) may be prompted to generate the feedback for each non-analogous modified region. In some embodiment, the feedback corresponding to each non-analogous modified region may be automatically generated. Further, the generated feedback may be stored within the database (i.e., the DFX results storage 220). Once the feedback for each non-analogous modified region is generated, then this process of generating the feedback for the one or more modified regions may be stopped as mentioned via step 1222.

In another embodiment, based on the check performed as mentioned via step 1210, when the CAD document is identified to be the new CAD document, then at step 1244, similar parts (or portion) of one or more existing regions corresponding to each of the set of regions of the CAD document may be identified. In particular, parts of the one or more existing regions that are similar to parts of a region of the set of regions may be identified from the historical dataset. Upon identifying similar parts of the one or more existing regions corresponding to the parts the region of the set of regions, at step 1246, a signature associated with the one or more existing regions may be retrieved. Once the signature associated with the similar parts of the one or more existing regions is retrieved, then at step 1248, each of the set of regions of the CAD document may be analyzed.

In an embodiment, each of the set of regions may be analyzed to identify an existing region corresponding to the set of regions as mentioned via step 1250. In order to identify the existing region corresponding to the set of regions, at step 1252, a signature for each of the set of regions may be generated.

Once the signature is generated, then at step 1254, the existing region corresponding to each of the set of regions may be identified. The existing region corresponding to each of the set of regions may be identified by comparing the signature generated for each part of the one or more existing regions with the signature generated for each of the set of regions. Further, based on the comparison, at step 1236, a check may be performed to identify if the existing region corresponding to the each of the set of regions exist within the DFX results storage 220. In first case, based on the check performed, when the existing region corresponding to the region of the set of regions is identified, then the region is categorized as the analogous modified region under the analogous regions category. Furthermore, in second case, based on the check performed, when the existing region corresponding to the region of the set of regions is not identified, then the region is categorized as the non-analogous modified region under the non-analogous regions category.

In the first case, for each analogous modified region within the analogous regions category, at step 1238, the feedback associated with the corresponding existing region may be retrieved from the database (same as the outcome database or the DFX results storage 220) and mapped to the analogous modified region. Further, at step 1240, the feedback mapped to the analogous modified region may be stored with the database (same as the outcome database or the DFX results storage 220). Once the feedback for each analogous modified region is mapped, then this process of mapping the feedback may be stopped as mentioned via the step 1222. In the second case, for each non-analogous modified region within the non-analogous regions category, at step 1242, the user (e.g., designer reviewer) may be prompted to generate the feedback for each non-analogous modified region. In some embodiment, the feedback corresponding to each non-analogous modified region may be automatically generated. Further, the generated feedback may be stored within the database (i.e., the DFX results storage 220). Once the feedback for each non-analogous modified region is generated, then this process of mapping the feedback may be stopped as mentioned via step 1222. This method of analyzing the CAD document and generating the feedback for each of the set of regions of the CAD document (both cases, i.e., when the CAD document is the new CAD document, and when the CAD document is the existing CAD document) has been already explained in detail in conjunction with FIGS. 1-11.

Various embodiments provide a method and a system for managing CAD documents. The disclosed method and system may generate a signature corresponding to a CAD document including a set of regions. Further, the disclosed method and system may analyse the CAD document including the set of regions based on the signature and an associated document type. The document type may be one of a new CAD document or an existing CAD document. Further, the disclosed method and system may categorize each of the set of regions into one of a set of pre-defined classification categories based on the analysis. The set of pre-defined classification categories may include a modified regions category and a non-modified regions category. Further, the modified regions category may include an analogous regions category and a non-analogous regions category. Additionally, the disclosed method and system may generate feedback corresponding to each of the set of regions based on an associated classification category of the set of pre-defined classification categories, upon categorizing. Thereafter, the disclosed method and system may render the feedback associated with one or more regions of the set of regions based on user requirements.

The disclosed method and system may provide some advantages like, the disclosed method and the system may enable seamless capturing of knowledge in designs and associated reviews and tradeoffs. Further, the disclosed method and system may use design similarity concepts to identify similar design issues. In addition, the disclosed method and system may leverage technology of comparing geometric differences to identify design regions that need to be reviewed. Moreover, the disclosed method and system may speed up the review process of overall design (i.e., the CAD document) which in turn reduces overall cycle time for design for multiple reviews. Further, the disclosed method and system may enable users working in an organization to get timely feedback on their design changes. Additionally, the disclosed method and system may provide guidance and input to new designers and subject matter experts who have recently joined the organization.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for managing computer aided design (CAD) documents, the method comprising:
    generating, by a computing device, a signature corresponding to a CAD document comprising a set of regions;
    analysing, by the computing device, the CAD document comprising the set of regions based on the signature and an associated document type, wherein the document type is one of a new CAD document or an existing CAD document;
    categorizing, by the computing device, each of the set of regions into one of a set of pre-defined classification categories based on the analysis, wherein the set of pre-defined classification categories comprises a modified regions category and a non-modified regions category, and wherein the modified regions category comprises an analogous regions category and a non-analogous regions category;
generating, by the computing device, feedback corresponding to each of the set of regions based on an associated classification category of the set of pre-defined classification categories, upon categorizing; and
rendering, by the computing device, the feedback associated with one or more regions of the set of regions based on user requirements.

2. The method of claim 1, further comprising:
receiving the CAD document comprising the set of regions as an input from a user;
generating the signature corresponding to the CAD document; and
storing the CAD document based on the signature in a document database.

3. The method of claim 1, wherein analysing the CAD document based on the signature comprises:
comparing the signature generated corresponding to the CAD document with historical dataset, wherein the historical dataset comprises a signature associated with each of a plurality of existing CAD documents comprising an associated set of existing regions; and
determining the document type associated with the CAD document based on comparing.

4. The method of claim 1, wherein categorizing each of the set of regions into one of the set of pre-defined classification categories comprises:
comparing each of the set of regions with the historical dataset;
classifying each of the set of regions into one of the set of pre-defined classification categories based on a pre-defined similarity threshold, in response to comparing; and
creating a subset of modified regions comprising one or more modified regions of the set of regions, and a subset of non-modified regions comprising one or more non-modified regions of the set of regions based on the associated classification category, upon classifying, wherein a similarity value of the one or more modified regions is below than the pre-defined similarity threshold, and wherein a similarity value of the one or more non-modified regions is above the pre-defined similarity threshold.

5. The method of claim 4, wherein generating feedback corresponding to a non-modified region of the one or more non-modified regions comprises:
identifying an existing region corresponding to the non-modified region from the historical dataset, wherein the existing region is same as the non-modified region;
retrieving the feedback associated with the existing region; and
mapping the feedback associated with the existing region to the non-modified region.

6. The method of claim 4, further comprising:
comparing each of the one or more modified regions with the historical dataset;
classifying each of the one or more modified regions into one of the modified regions category based on a pre-defined overlapping threshold, in response to comparing; and
creating a subset of analogous regions comprising one or more analogous modified regions and a subset of non-analogous regions comprising one or more non-analogous modified regions based on an associated modified region category, upon classifying, wherein an overlapping value of each of the one or more analogous modified regions is above than the pre-defined overlapping threshold, and wherein an overlapping value of each of the one or more non-analogous modified regions is below than the pre-defined overlapping threshold.

7. The method of claim 6, wherein generating feedback corresponding to an analogous modified region of the one or more analogous modified regions comprises:
identifying an existing region corresponding to the analogous modified region from the historical dataset, wherein the existing region is same as the analogous modified region;
retrieving the feedback associated with the existing region; and
mapping the feedback associated with the existing region to the analogous modified region.

8. The method of claim 6, wherein generating feedback corresponding to a non-analogous modified region of the one or more non-analogous modified regions comprises:
determining absence of an existing region corresponding to the non-analogous modified region within the historical dataset; and
prompting a user to provide the feedback corresponding to the non-analogous modified region, upon determining the absence of the existing region.

9. The method of claim 1, further comprising:
storing the feedback associated with each of the set of regions in an outcome database.

10. The method of claim 9, wherein rendering the feedback comprises:
receiving a user input corresponding to the one or more regions;
retrieving the feedback associated with each of the one or more regions from the outcome database;
generating a customized view corresponding to the feedback associated with the one or more regions based on the user requirements; and
presenting the customized view to the user.

11. A system for managing computer aided design (CAD) documents, the system comprising:
a processor; and
a memory coupled to the processor, wherein the memory stores processor executable instructions, which, on execution, causes the processor to:
generate a signature corresponding to a CAD document comprising a set of regions;
analyse the CAD document comprising the set of regions based on the signature and an associated document type, wherein the document type is one of a new CAD document or an existing CAD document;
categorize each of the set of regions into one of a set of pre-defined classification categories based on the analysis, wherein the set of pre-defined classification categories comprises a modified regions category and a non-modified regions category, and wherein the modified regions category comprises an analogous regions category and a non-analogous regions category;
generate feedback corresponding to each of the set of regions based on an associated classification category of the set of pre-defined classification categories, upon categorizing; and
render the feedback associated with one or more regions of the set of regions based on user requirements.

12. The system of claim 11, wherein the processor executable instructions further cause the processor to:
- receiving the CAD document comprising the set of regions as an input from a user;
- generating the signature corresponding to the CAD document; and
- storing the CAD document based on the signature in a document database.

13. The system of claim 11, wherein, to analyse the CAD document based on the signature, the processor executable instructions further cause the processor to:
- compare the signature generated corresponding to the CAD document with historical dataset, wherein the historical dataset comprises a signature associated with each of a plurality of existing CAD documents comprising an associated set of existing regions; and
- determine the document type associated with the CAD document based on comparing.

14. The system of claim 11, wherein, to categorize each of the set of regions into one of the set of pre-defined classification categories, the processor executable instructions further cause the processor to:
- compare each of the set of regions with the historical dataset;
- classify each of the set of regions into one of the set of pre-defined classification categories based on a pre-defined similarity threshold, in response to comparing; and
- create a subset of modified regions comprising one or more modified regions of the set of regions, and a subset of non-modified regions comprising one or more non-modified regions of the set of regions based on the associated classification category, upon classifying, wherein a similarity value of the one or more modified regions is below than the pre-defined similarity threshold, and wherein a similarity value of the one or more non-modified regions is above the pre-defined similarity threshold.

15. The system of claim 14, wherein, to generate feedback corresponding to a non-modified region of the one or more non-modified regions, the processor executable instructions further cause the processor to:
- identify an existing region corresponding to the non-modified region from the historical dataset, wherein the existing region is same as the non-modified region;
- retrieve the feedback associated with the existing region; and
- map the feedback associated with the existing region to the non-modified region.

16. The system of claim 14, wherein the processor executable instructions further cause the processor to:
- compare each of the one or more modified regions with the historical dataset;
- classify each of the one or more modified regions into one of the modified regions category based on a pre-defined overlapping threshold, in response to comparing; and
- create a subset of analogous regions comprising one or more analogous modified regions and a subset of non-analogous regions comprising one or more non-analogous modified regions based on an associated modified region category, upon classifying, wherein an overlapping value of each of the one or more analogous modified regions is above than the pre-defined overlapping threshold, and wherein an overlapping value of each of the one or more non-analogous modified regions is below than the pre-defined overlapping threshold.

17. The system of claim 16, wherein, to generate feedback corresponding to an analogous modified region of the one or more analogous modified regions, the processor executable instructions further cause the processor to:
- identify an existing region corresponding to the analogous modified region from the historical dataset, wherein the existing region is same as the analogous modified region;
- retrieve the feedback associated with the existing region; and
- map the feedback associated with the existing region to the analogous modified region.

18. The system of claim 16, wherein, to generate feedback corresponding to a non-analogous modified region of the one or more non-analogous modified regions, the processor executable instructions further cause the processor to:
- determine absence of an existing region corresponding to the non-analogous modified region within the historical dataset; and
- prompt a user to provide the feedback corresponding to the non-analogous modified region, upon determining the absence of the existing region.

19. The system of claim 11, wherein the processor executable instructions further cause the processor to store the feedback associated with each of the set of regions in an outcome database.

20. The system of claim 19, wherein, to render the feedback, the processor executable instructions further cause the processor to:
- receive a user input corresponding to the one or more regions;
- retrieve the feedback associated with each of the one or more regions from the outcome database;
- generate a customized view corresponding to the feedback associated with the one or more regions based on the user requirements; and
- present the customized view to the user.

21. A non-transitory computer-readable medium storing computer-executable instructions for managing computer aided design (CAD) documents, the stored instructions, when executed by a processor, cause the processor to perform operations comprises:
- generating a signature corresponding to a CAD document comprising a set of regions;
- analysing the CAD document comprising the set of regions based on the signature and an associated document type, wherein the document type is one of a new CAD document or an existing CAD document;
- categorizing each of the set of regions into one of a set of pre-defined classification categories based on the analysis, wherein the set of pre-defined classification categories comprises a modified regions category and a non-modified regions category, and wherein the modified regions category comprises an analogous regions category and a non-analogous regions category;
- generating feedback corresponding to each of the set of regions based on an associated classification category of the set of pre-defined classification categories, upon categorizing; and
- rendering the feedback associated with one or more regions of the set of regions based on user requirements.

* * * * *